United States Patent
Myers

Patent Number: 5,453,308
Date of Patent: Sep. 26, 1995

[54] METHOD AND SYSTEM OF FLORAL ARRANGEMENT

[76] Inventor: William R. Myers, 5400 Scotts Valley Dr., Scotts Valley, Calif. 95066

[21] Appl. No.: 357,599

[22] Filed: Dec. 15, 1994

[51] Int. Cl.$^6$ ............................................. A41G 1/00
[52] U.S. Cl. ........................... 428/24; 434/93; 156/63
[58] Field of Search .................... 428/17, 23, 24, 428/131; 47/41.01, 41.12; 434/93; 156/63

*Primary Examiner*—Alexander S. Thomas
*Attorney, Agent, or Firm*—Carole F. Barrett

[57] ABSTRACT

A floral arrangement system for assembling, preparing and arranging pre-selected floral materials into a pre-selected floral arrangement includes a pattern system which includes a material list for instructing a user on obtaining pre-selected floral materials; a tool list for instructing the user on assembling tools to be used with the system; an integrated measurement means for measuring pre-selected floral materials to pre-selected lengths; an instruction means for instructing the user on preparing and arranging the materials into the preselected floral arrangement; and at least one placement pattern including pre-selected floral graphic placement pattern symbols showing the placement of each floral material.

26 Claims, 4 Drawing Sheets

FIG._1

FLORAL PLACEMENT PATTERN
Sunflower Summer Arrangement
THE PATTERN BELOW IS FOR YOUR REFERENCE
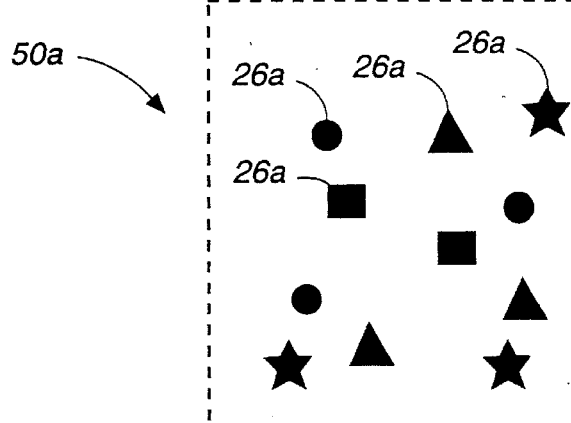
CUT ALONG DOTTED LINE AND GLUE TO TOP OF FOAM
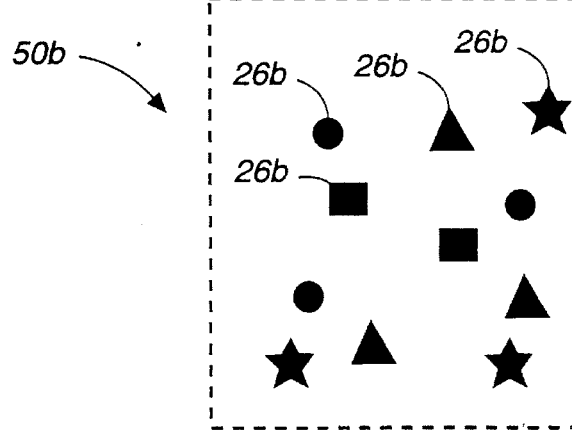
PATTERN 1
FIG._2

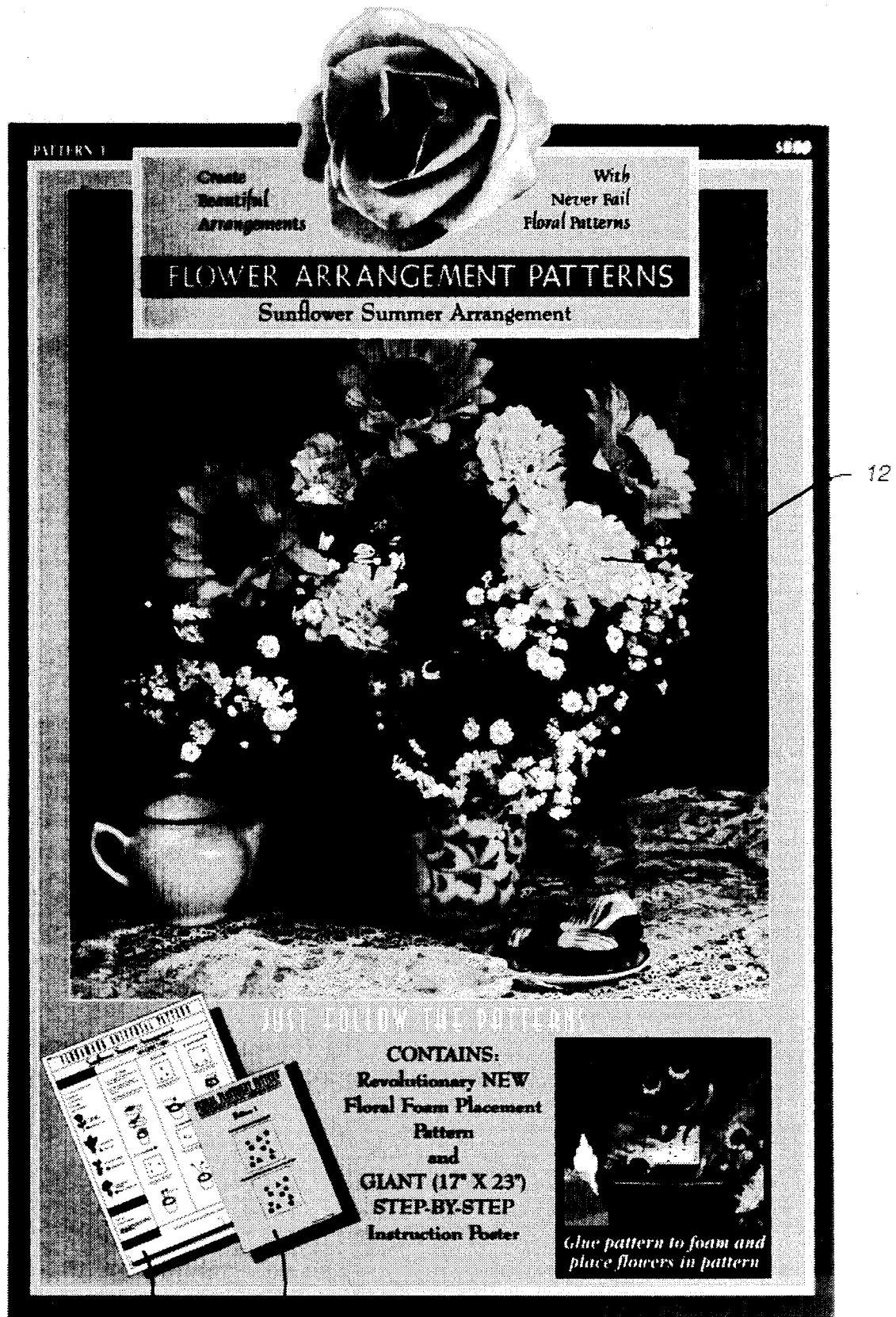
FIG._3

NOW, A BEGINNER CAN CREATE BEAUTIFUL ARRANGEMENTS

Now even a beginner can create professional floral arrangements by applying the revolutionary new FLORAL PLACEMENT PATTERN™ and following the simple step-by-step INSTRUCTIONAL POSTER contained in this envelope. Just purchase the materials shown below, and you have everything needed to create your own floral masterpiece.

MATERIALS TO BUY:

Materials
- 4" diameter 3" tall blue and white pot
- one black floral foam
- 1 ounce sphagnum moss
- white craft glue

Tools
- wire cutter
- knife for cutting foam

3 stems small single sunflowers

3 stems purple lilacs

2 stems yellow marigolds

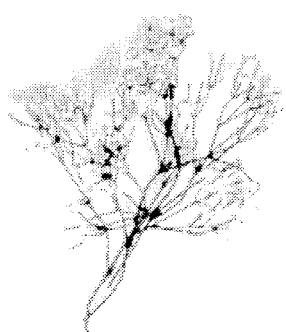
3 stems white baby's breath spray

FIG._4

METHOD AND SYSTEM OF FLORAL ARRANGEMENT

The invention relates to an improved method and system for arranging a preselected floral arrangement including fresh, artificial, e.g., silk, or dried floral material or some combination thereof, wherein the system for arranging the preselected floral arrangement is packaged and sold separately from the floral material and non-floral material used to achieve the arrangement.

BACKGROUND OF INVENTION

A coordinated floral arrangement method and system was disclosed and claimed in U.S. Pat. No. 4,600,612 issued Jul. 15, 1986 to Litwin et al. (Litwin et al.). Other patents disclosing mechanical devices for floral arranging include U.S. Pat. Nos. 2,305,567 issued Dec. 15, 1942; 2,981,003 issued Apr. 24, 1961; 3,044,200 issued Jul. 17, 1962, 3,424,641 issued Jan. 28, 1969; 3,974,915 issued Aug. 17, 1976; 4,606,950 issued Aug. 19, 1986; and 4,937,109 issued Jun. 26, 1990.

Litwin et al. disclose and claim a floral arrangement and assembly system that allows artificial flowers and floral foam to be transported in disassembled form to reduce storage space and transportation costs. The flowers and accessories as disclosed and claimed by Litwin et al. are preselected and prepackaged for the consumer and then shipped as a unit and sold to the consumer as self-contained unit. The device and system sold to the consumer includes artificial preselected flowers each of which has a position indicator attached to its stem; a piece of pre-cut floral foam; and a template that has positional indicia that indicates the position in which the user is to place the corresponding preselected artificial flowers.

Several problems exist with the invention disclosed and taught by Litwin et al. and the other references. In the first instance, the arrangement assembly system taught and claimed by Litwin et al. is applicable only to the preselected artificial flowers that are prepackaged with the assembly. This is because the system taught by Litwin et al. depends on the coordination of indicia placed on the pre-packed flowers with indicia placed on a pre-matched template. Therefore, the arrangement assembly system taught and claimed by Litwin et al. is not useable by a person who wishes to use fresh flowers, dried flowers, or artificial flowers, or for that matter any flower other than those specifically prepackaged, pre-numbered and shipped with the system. For example, a user may wish to select floral material that specifically coordinates with the user's color scheme, or the user may wish to reuse or recycle the system by replacing the "old" flowers with "new" flowers.

Although the stated object of Litwin et al. is to provide a system and method whereby storage, shipping and shelf space costs are minimized through use of the claimed system, because the foam and floral materials are placed in and shipped as part of each unit, each of the resulting packages is relatively bulky and consumes a large amount of shelf space which is extremely expensive and valuable. Additionally, the Litwin et al. system requires wholesalers, retailers and end-users to purchase materials they may otherwise have on hand, or that may be readily available at a lower cost from other sources.

Another problem with the arrangement assembly system taught and claimed by Litwin et al. is that the user is unable to choose floral materials that fit his or her needs. Additionally, the Litwin et al. system is inapplicable to use of a combination of fresh, dried and artificial flowers. In essence, because of the coordination of prepackaged and pre-numbered flowers with a pre-numbered template, Litwin et al. is limited to use of the specific flowers shipped with the prepackaged system. Litwin et al. neither disclose nor claim a method wherein the user is taught to use materials other than those pre-selected and pre-packed as part of the system. Litwin et al do not suggest any method for selection of floral materials, or methods of preparing such materials for use, e.g. how to adjust the length of individual floral materials.

Additionally, the teaching in Litwin et al. is restricted to a method for merely placing preselected flowers into a template in a vertical fashion. Litwin et al. state that an object of the disclosed system is to provide a system wherein particular designs are easily reproduced; however, Litwin et al. do not teach, suggest, or claim any method whereby the user is assisted in shaping the floral pieces to form an arrangement wherein the floral material is bent or otherwise positioned to achieve a completed arrangement that is pleasing to the eye. Litwin et al. make no suggestions as to the angle of the stems, or the bending of the stems to create a desired shape for the arrangement. There is no suggestion in Litwin et al. that dimensionality is a desired object or a consideration. Litwin et al. were merely concerned with pre-packing a preselected product to control costs by shipping all components of an arrangement unassembled. Litwin et al. were not concerned with obtaining floral arrangements that were multidimensionally pleasing. Litwin et al. were also not concerned with providing a system that was readily useable by the untrained consumer and which would allow such a consumer to achieve professional quality arrangements.

SUMMARY OF INVENTION

In view of the prior art, a major object of the present invention is to present the user, especially those with little or no prior flower arranging experience with a system and method for coordinating floral arrangements such that the user chooses his own materials from fresh, artificial, or dried floral materials, or a combination of such floral materials and achieves a preselected professional level arrangement.

Another major objective of the present invention is to provide a reusable system and method that allows floral material in an arrangement to be replaced by the user with new or different floral materials as the then currently used materials die or age, or according to the discretion, need or whim of the user and allows the user to re-achieve a professional level preselected arrangement.

It is a further object of the present invention to provide a system and method for selecting the proper length of each floral material and for non-floral materials such as ribbons, using a floral measurement device provided with the system.

It is a further object of the present invention to provide a method whereby the user is guided to shape the floral materials so as to produce professional quality floral arrangements that are easily reproducible, are shaped so as to be multidimensionally pleasing, and are capable of being assembled and shaped by the user using only the multidimensional placement and shaping instructions provided with the system.

One of the reasons that untrained consumers do not purchase materials and attempt to form floral arrangements is that such consumers do not know which floral materials to purchase to make an aesthetically pleasing arrangement. Nor do such untrained consumers know how many stems of selected floral materials to purchase. Nor do such consumers know the length to which each stem should be cut. Therefore, untrained consumers either purchase the incorrect quantity or the incorrect quality of floral materials, or both.

This leads to frustration on the part of consumers who have spent a considerable amount of time, money and effort, but are unable to achieve arrangements that are eye pleasing. It also leads in the short run to wasted floral materials. In the long run, because of frustration at being unable to achieve a professional quality arrangement, the untrained consumer will generally not continue to purchase materials and will cease all attempts to arrange flowers by himself. Therefore, it is the object of the present invention to allow an ordinary consumer who has little or no formal training in floral arranging to purchase appropriate and varied floral materials and non-floral materials and to create from those floral materials professional quality floral arrangements.

A further object of the present invention is to provide instructions to the user to enable the user to obtain the appropriate quantity of floral materials so as to complete the preselected arrangement. An additional object is to instruct the user to properly prepare the materials he or she has obtained for use in the system so as best to achieve a preselected professional quality arrangement.

Although the stated object of Litwin et al. was to minimize transportation and storage space, because floral foam and floral materials are an integral part of the Litwin system and floral materials including the floral base material are shipped and stored with the unit, the resulting package is relatively expensive, bulky and cumbersome to ship. Additionally, each Litwin et al. package requires a relatively large amount of expensive storage or shelf space once it reaches the wholesaler or retailer. Additionally, the retailer or wholesaler is limited to selling the materials prepackaged with the unit.

Therefore, a further object of the present invention is to overcome shipping and storage problems that remain unsolved by Litwin et al. A further object and benefit of the present invention is to provide wholesalers and/or retailers with a product that will sell along with floral materials in their inventory or which they obtain from various suppliers. This allows the wholesaler and/or retailer to maintain the margin on floral materials.

The system disclosed and claimed in the present invention is shipped as a generally flat piece, without floral materials and without floral foam. Therefore, each piece does, in fact, require minimal shipping, storage, and shelf space and is shipped with minimal cost.

Moreover, as suggested above the present system does not require the wholesaler or retailer to purchase or use materials that are otherwise readily available, such as foam, floral materials and non-floral materials, as an integral part of the package. The system taught in the present invention allows the wholesaler or retailer to separately purchase floral bases, floral materials and non-floral materials so as to be able to offer the consumer a wide range in the quality and price of such floral materials. It also allows the wholesaler, retailer or consumer to use materials that have been purchased from various suppliers or that are otherwise on hand.

The foregoing and other objects, features and advantages will be apparent from the following description of the preferred embodiment of the invention as illustrated in the accompanying drawings.

BRIEF DESCRIPTION OF THE DRAWINGS

FIG. 1 is a perspective, diagrammatical view of a pattern system according to the present invention; and FIG. 2 is a top view of a detached placement pattern according to the present invention.

FIG. 3 is a front view of the packaging used to transport a floral arrangement utilizing the present invention.

FIG. 4 is a back view of the packaging used to transport a floral arrangement utilizing the present invention.

DESCRIPTION OF THE PREFERRED EMBODIMENT

As shown in FIG. 1, there is a pattern system 10 for floral arranging whereby a pre-selected floral arrangement 12 is assembled. The pattern system 10 is preferably packaged in a flat preferably envelope-type container. A preferred embodiment of such a container is shown in FIG. 3 (front) and FIG. 4 (back). Preferably, the container for the system will include one or more visual representations of the pre-selected floral arrangement as completed. FIG. 3, as shown includes such a visual representation.

Pattern system 10 comprises as an integral part thereof a material list 14, a tool list 16, a measurement or measuring means 18, and an instruction means 20 for instructing the user on assembling a multidimensional preselected floral arrangement 12. In a preferred embodiment, the pattern system 10 also optionally includes a design guide means 36 and a designer tip means 44.

Materials list 14 includes each floral material 22 needed to assemble the preselected floral arrangement 12. In a preferred embodiment of the present invention as shown in FIG. 1, a graphic representation 24 of each such floral material is provided. The preferred embodiment as shown in FIG. 1 also includes the number of stems of each floral material, the preferred number of flower heads on each stem, and the preferred colors of each floral material. In a preferred embodiment, the material list 14 also keys or represents each type of floral material 22 with a pre chosen floral graphic symbol 26 for example, circles, ovals, stars, squares, rectangles, triangles, and hexagons and the like (some of which are shown in FIG. 1).

Alternatively, one floral graphic symbol 26, for example, a circle, may be chosen to represent all floral materials, and each individual floral material may be assigned a color code, e.g., rose buds may be represented by a pink circle, phlox by a purple circle, sunflowers by a yellow circle and so forth (not shown). In another alternative embodiment, each floral material 22 is coordinated with a number or letter, e.g., sunflowers with 1 or A, lilacs with 2 or B and so forth (not shown).

Additionally, material list 14 includes ancillary material 38 needed by the user to complete the floral arrangement 12. Said ancillary material includes a container 28; and base material such as floral foam 30. In a preferred embodiment ancillary material 38 includes non-floral decorative material 32, e.g., ribbons, balloons, artificial birds and the like (not shown in FIG. 1); and decorative material 34 to cover the selected base material 30, e.g., moss or similar material.

The tool list 16 comprises implements needed or useful for using the method and system of the present invention to complete the preselected floral arrangement 12, e.g., wire cutters 40 and knife 42 as shown on FIG. 1. In a preferred embodiment, the tool list 16 includes graphic representations of each of the tools (not shown).

The method and system of the present invention also includes a placement pattern 50 as shown in FIG. 3. The placement pattern 50 may be included as a separate sheet as shown in FIG. 3. In a preferred embodiment, pattern 50 is included as a detachable part of the pattern 10 and is detached from the pattern by the user prior to completion of the preselected arrangement. For example, the placement arrangement pattern 50 may be detachable from pattern 10 by cutting along a line or by other means of separating the placement pattern 50 from the rest of the pattern system, e.g., by tearing perforations located between the placement pattern and the rest of the pattern system. A representation of a means for attaching placement pattern 50 to base material 30 may be included either in the materials list 14, e.g., glue or glue sticks or in the tool list, e.g., hot glue gun.

In a preferred embodiment as shown in FIG. 2, placement pattern 50 includes pattern 50a and pattern 50b. Pattern 50a is substantially a duplicate of pattern 50b. Pattern 50a includes a plurality of floral placement pattern graphic symbols 26a. Pattern 50b includes a plurality of floral placement pattern graphic symbols 26b. Each floral placement pattern graphic symbol 26a and 26b corresponds to a floral graphic symbol 26 pre-chosen for each separate type of floral material.

In the event that the preselected arrangement contains non-floral decorative material, e.g., ribbons, balloons and the like, then pattern 50a and pattern 50b may include non-floral placement pattern graphic symbols corresponding to the graphic symbols used to represent the non-floral material (not shown).

As will become evident, one of the placement patterns 50a or 50b is selected for attachment to the base material and floral materials are inserted through the pattern and into the base material matching floral materials to corresponding graphic symbols. The non-selected pattern is retained by the user and is used to further guide the user in the placement of floral materials once placement of floral materials has begun and the graphic symbols on the placement pattern become obscured by the floral materials already placed through the pattern that has been attached to the base material. Use of two placement patterns in this manner futher assures that the user will obtain the professional quality pre-selected arrangement.

As shown in FIG. 1, the pattern system 10 further includes a measurement or measuring means 18 that allows the user to measure floral materials and non-floral materials that he or she has selected in accordance with the method and system of the present invention. It should be noted that the measurement means as shown in FIG. 1 is not drawn to scale. After measuring each floral stem to the preselected length, the user will cut the stems of each individually selected floral material to said appropriate preselected length. After measuring generally linear non-floral materials e.g., ribbons, in accordance with the method and system of the present invention, the user will cut such non-floral material to the preselected length.

The measuring means 18 has a first-end 52 and a second-end 54 and preselected markings 56. The preselected markings 56 as shown in FIG. 1 correspond to the actual number of inches (or centimeters, not shown) in length corresponding to the length of each preselected floral material. In an alternative embodiment, not shown, marking indicia corresponding to each of the pre-selected floral material graphic symbols 26 are used in place of the length numbers. For example, if the length of the rosebud is to be 10 inches, instead of using the symbol 10", a pink circle could be appropriately placed at ten inches from the first end 52 of the measurement means. Therefore, in such a preferred embodiment one such set of preselected markings 56 are the graphic symbols 26 preselected to represent each floral material, for example, a star, a triangle, a circle or oval, a rectangle, a hexagon, a square, and the like. In the system as shown in FIG. 1, if such were used a triangle were selected to represent open roses in the material list, then the preselected marking indicia for open roses included on the measuring means 18 is likewise be triangle.

In other embodiments, the preselected marking indicia may be colors, numbers, letters or the like coordinated with those symbols chosen to represent the floral materials. In another preferred embodiment of the present invention, a graphic representation of each floral material itself is used as the marking indicia. Indicia representing each non-floral decorative material such as ribbons may also be included on the measuring means 18.

The user places each selected floral stem on the measuring means 18 such that the end of the stem having the flowering portion is adjacent to the preselected symbol for the particular floral material being measured. The non-flowering end of the stem is placed so that it extends past the first end 52 of the measurement means 18. The user then cuts the stem so that the entire length of the floral material including the flowering portion is equal to the distance between the first end 52 of the measuring means and the preselected marking indicia 56 corresponding to the floral material being measured. Each floral material is measured and cut in a similar fashion. Each generally linear non-floral material is likewise measured, and cut, and prepared in the system and method of the present invention.

In order to use the system and method of the present invention, the user preferably first assembles the preselected floral and non-floral materials included in material list 14 and the items included in tool list 16. Base material 30 is cut so as to fit into container 28 chosen by user. In a preferred embodiment, placement pattern 50 is detached from pattern system 10. In another embodiment, placement pattern 50 is provided already detached from the other elements of pattern system 10.

In the preferred embodiment, placement pattern 50 includes pattern 50a that will be retained and used as a guide throughout placement of the floral materials and 50b that will be attached to the floral base material. Pattern 50a is separated from pattern 50b and pattern 50b is positioned on a generally horizontal side of base material 30 that may be referred to as its top side. Placement pattern 50b attached to the top side of the base material. Such attachment may be permanent, semi-permanent readily or detachable. The benefit of detachable and semi-permanent attachment of the pattern 50b to the base material is that the user may reuse placement pattern 50b with different base material.

The user measures each piece of floral material and where appropriate non-floral material as described herein using the measuring means 18 provided with the system of the present invention. After adjusting the length of the floral materials and non-floral materials using the graphic representation for each floral and non-floral material provided in the pattern system, the user inserts the non-flowering end of the stem of each selected floral material through pattern 50b and into the base material at the appropriate floral placement pattern graphic representation and in accordance with the instruction means 20. The instruction means 20 preferably includes graphic illustrations for visually instructing the user as to which floral materials and which stems of each floral material should or should not be bent, in which direction each material should be bent, and how the floral materials should be intertwined to achieve an aesthetically pleasing, professional quality, multidimensional preselected arrangement. As each flower is added to the arrangement, it is shaped based on the graphic representations included in instruction means 20 of the pattern system.

As the user adds floral materials it will become difficult to see the graphic representations on the pattern 50b that has been attached to the base material. In order to overcome this problem and assist the user to obtain the intended floral design, the user will refer to pattern 50a which is substantially identical to pattern 50b and is used as a reference pattern. As floral materials are added to the arrangement it will become increasing difficult to see the graphic representations of the floral materials on pattern 50b that represent floral materials that have not yet been added. Thus, by referring to the graphic representations as shown reference pattern 50a which substantially duplicate the placement of graphic representations as shown on pattern 50b, the user is further assisted in adding floral materials with confidence and assurance so that each floral piece whether it is the first one added or the last one added or any piece in between is being inserted in the correct pre-selected position and that the final result will duplicate the pre-selected arrangement.

Non-floral decorative material is added by the user in a preferred embodiment by matching the non-floral decorative material graphic symbol with the appropriately corresponding non-floral decorative material placement pattern graphic symbol (not shown).

In accordance with the instruction means 20, decorative material 34 is added to cover the base material 30.

In order to achieve the desired pre-selected arrangement, the user is preferably provided with a design guide means 36 including one or more additional views, for example a top view, a front view, a side view, or a back view, of the preselected arrangement as completed. In a preferred embodiment the design guide means 36 may also include one or more views of the arrangement as partially competed. The design guide means allows the user of the method and system of the present invention to achieve and further enhance the professional appearance and quality of the arrangement.

To further enhance the professional appearance and quality of the arrangement, the method and system of the present invention in preferred embodiments includes designer tip means 44. For example, as shown in FIG. 1, if the arrangement is made of silk or other artificial flowers, the tip means may provide a means for the user to add fragrance or flower oil to the arrangement to enhance the appearance that the arrangement is of a professional quality.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. A floral arrangement system for assembling, preparing and arranging preselected floral materials into a pre-selected floral arrangement comprising a pattern system wherein said pattern system comprises:

a material list for instructing a user on assembling said preselected floral materials;

a tool list for instructing the user on assembling tools to be used with said system;

a measurement means for measuring said preselected floral materials to preselected lengths;

an instruction means for instructing said user on preparing and arranging said preselected floral material so as to obtain said preselected floral arrangement; and at least one placement pattern, each said placement pattern of which includes a plurality of preselected floral graphic placement pattern symbols showing the placement of each floral material used to assemble the preselected floral arrangement.

2. The floral arrangement system of claim 1 wherein said material list comprises a representation of each preselected floral material needed to arrange said preselected floral arrangement.

3. The floral arrangement system of claim 2, wherein each said representations of each preselected floral material is a graphic representation.

4. The floral arrangement system of claim 2, wherein said material list further comprises indicia of a number of stems of each preselected floral material, an indicia of the number of flower heads on each stem, and an indicia of preferred colors of each preselected floral material.

5. The floral arrangement system of claim 2, wherein each preselected floral material is represented by a pre-chosen floral graphic symbol.

6. The floral arrangement system of claim 5, wherein said floral graphic symbol corresponding to each floral material to be used in said preselected floral arrangement is selected from the group consisting essentially of a circle, an oval, a star, a square, a rectangle, a triangle and a hexagon.

7. The floral arrangement system of claim 2, wherein said material list further comprises ancillary material.

8. The floral arrangement system of claim 7, wherein said ancillary material includes a container, base material, and decorative material for covering said base material.

9. The floral arrangement system of claim 1 wherein said material list further includes preselected non-floral materials to be used to complete the preselected floral arrangement.

10. The floral arrangement system of claim 9 wherein said non-floral materials include balloons and ribbons.

11. The floral arrangement system of claim 1, wherein said tool list comprises a list of implements for completing said preselected floral arrangement.

12. The floral arrangement system of claim 11, wherein said list includes graphic representations of each implement.

13. The floral arrangement system of claim 1, wherein said placement pattern is detachably attached to said pattern system.

14. The floral arrangement system of claim 1, wherein said placement pattern is separate from said pattern system.

15. The floral arrangement system of claim 1, wherein said system includes a plurality of substantially identical placement patterns.

16. The floral arrangement system of claim 15, wherein said placement patterns comprise a first placement pattern for attachment to a floral base material and a second placement pattern for use as a guide for placement of preselected floral materials through said first placement pattern and into said floral base material at predesignated positions.

17. The floral arrangement system of claim 1, wherein said material list further comprises a pre-selected floral graphic for each pre-selected floral material and said floral graphic placement pattern symbols on said placement pattern correspond with said preselected floral graphic symbols for each floral material in the material list.

18. The floral arrangement system of claim 17, wherein said floral graphic placement pattern symbols are selected from the group consisting essentially of a circle, an oval, a star, a square, a rectangle, a triangle and a hexagon.

19. The floral arrangement system of claim 17 further comprising pre-selected non-floral materials wherein said non-floral materials are represented on the material list by non-floral graphic symbols and wherein said non-floral materials are represented on the placement pattern by a plurality of corresponding non-floral graphic placement pattern symbols.

20. The floral arrangement system of claim 1, wherein said measurement means comprises a means integral with the pattern system allowing measurement of floral materials wherein such measurement means includes a first end and a second end and a plurality of pre-selected markings at pre-selected intervals between said first end and said second end wherein each such pre-selected marking corresponds to the length of a pre-selected floral material.

21. The floral arrangement system of claim 20, wherein said preselected markings comprise graphic representations preselected for each floral material.

22. The floral arrangement of claim 20, wherein said preselected markings are selected from a group consisting essentially of a circle, an oval, a triangle, a square, a rectangle, and a star.

23. The floral arrangement system of claim 1 further comprising a design guide, said guide which is adapted to provide at least one view of said preselected floral arrangement as assembled.

24. The floral arrangement system of claim 1 further comprising a designer tip.

25. The floral arrangement of claim 1, wherein said instruction means includes a plurality of graphic representations illustrating how each floral material is positioned or bent to achieve preselected multidimensional positioning.

26. The floral arrangement system of claim 1, wherein said arrangement is comprised of floral material selected from the group consisting essentially of dried, fresh and artificial floral material.

\* \* \* \* \*